(12) United States Patent
Yim

(10) Patent No.: US 6,422,509 B1
(45) Date of Patent: Jul. 23, 2002

(54) TRACKING DEVICE

(75) Inventor: Mark H. Yim, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/722,627

(22) Filed: Nov. 28, 2000

(51) Int. Cl.$^7$ .............................. F41G 7/00; F42B 10/00; F42B 15/01; G06F 19/00; A63H 27/00

(52) U.S. Cl. ..................... 244/3.21; 244/17.23; 446/34; 446/36; 446/57

(58) Field of Search ........................... 446/175, 57, 34, 446/36, 37, 38, 58; 244/17.11, 17.23, 3.21

(56) References Cited

U.S. PATENT DOCUMENTS

| | | | | |
|---|---|---|---|---|
| 2,980,365 A | * | 4/1961 | Yohe | 244/17.17 |
| 3,149,803 A | * | 9/1964 | Petrides | 244/17.13 |
| 3,603,033 A | | 9/1971 | Mueller | |
| 4,271,629 A | | 6/1981 | Goodwin | |
| 4,443,014 A | * | 4/1984 | Kovit et al. | 244/190 |
| 4,478,379 A | * | 10/1984 | Kerr | 244/120 |
| 4,568,040 A | * | 2/1986 | Metz | 102/384 |
| 4,624,424 A | * | 11/1986 | Pinson | 102/384 |
| 4,886,222 A | * | 12/1989 | Burke | 102/384 |
| 4,890,554 A | * | 1/1990 | Schleimann-Jensen | 102/384 |
| 5,110,314 A | * | 5/1992 | Fujihara et al. | 446/34 |
| 5,259,729 A | * | 11/1993 | Fujihira et al. | 416/131 |
| 5,297,759 A | * | 3/1994 | Tilbor | |
| 5,634,839 A | * | 6/1997 | Dixon | 446/37 |
| 5,971,320 A | * | 10/1999 | Jermyn et al. | 244/17.25 |

OTHER PUBLICATIONS

Crenshaw, Hugh C., "Orientation by Helical Motion—I. Kinematics of the Helical Motion of Organisms with up to Six Degrees of Freedom," *Bulletin of Mathematical Biology*, vol. 55, No. 1, pp. 197–212, (1993).

* cited by examiner

Primary Examiner—Jacob K. Ackun
Assistant Examiner—Bera B. Miller
(74) Attorney, Agent, or Firm—Oliff & Berridge, PLC

(57) ABSTRACT

A tracking device includes a motor, top and bottom propellers of opposite sense attached to the stator and rotor of the motor for rotation in opposite directions. Target sensors are provided on the propellers and signals from the target sensors are supplied to a controller that controls the rotation of the motor and the propellers. The tracking device also includes a power supply for the motor and the controller.

12 Claims, 4 Drawing Sheets

TRACKING DEVICE

BACKGROUND OF THE INVENTION

1. Field of Invention

This application relates to a tracking device, having one controllable degree of freedom, that is movable with three degrees of freedom.

2. Description of Related Art

Tracking devices may be used in areas such as planetary exploration, mobile remote sensing, tracking of moving land-based agents such as people, animals, and automobiles, tracking of flying objects, automatically deployable perimeter sensors, toys, sound input/output device which follow a user for example for actors on a stage, for mobile phone users, a computer input device that follows a mobile user, and smart bombs. However, in order for the tracking device to translate in a three dimensional space, complicated propulsion and control systems are necessary. This results in tracking devices of increased cost and size.

Eukaryotic single-celled micro-organisms function as tracking devices in a neutrally buoyant medium, but are capable of controlling only one degree of freedom. The micro-organisms are capable of movement in a three dimensional space, however, move toward and away from a sensed stimuli, such as food sources and light. The micro-organisms control their one degree of freedom to essentially move forward in a helical pattern. The micro-organisms track a stimuli by modulating the speed of their one degree of freedom motion through a simple feedback system. As the microorganism spins around, it senses the stimuli sinusoidally. By modulating its spinning speed in a manner directly proportional to the sensed stimuli, the micro-organism moves toward, or away from, depending on the sense of modulation, the stimuli by precession, i.e., the motion of an axis of the microorganism due to an applied external force. The motion of single-celled micro-organisms is described more thoroughly in "Orientation by Helical Motion-I. Kinematics of the Helical Motion of Organisms with up to Six Degrees of Freedom," by Hugh C. Crenshaw, published in the Bulletin of Mathematical Biology, Vol. 55, No. 1, pp. 197–212 (1993), incorporated herein by reference in its entirety.

Propeller-driven aerial toys and amusement devices are known, for example, from U.S. Pat. No. 4,271,629 and 3,603,033. U.S. Pat. No. 5,533,920 to Goodwin discloses a propeller-driven aerial toy having front and, rear propellers driven by a rubber-band motor and a lock and release mechanism usable to control the rotation of the propellers. U.S. Pat. No. 3,603,033 to Mueller discloses a flying rotorcraft toy having a driven propeller mounted in a duct. Lifting rotor blades extend from the top of the duct. The duct and blades rotate oppositely to the propeller, due to torque. The lift of the blades thus adds to the lift provided by the propeller for vertical propulsion.

The flying toys discussed above include complicated transmissions and are not capable of tracking a target. The flying toys also require initiation and supervision by an operator and are operable only with a limited type of power supply.

SUMMARY OF THE INVENTION

This invention provides a tracking device that is movable with three translational degrees of freedom under gravity by controlling movement with one degree of freedom without explicit orientation toward a target.

In various exemplary embodiments of the tracking device according to this invention, the tracking device includes a motor, top and bottom propellers of opposite sense attached to the stator and rotor of the motor for rotation in opposite directions. Target sensors are provided on the propellers and signals from the target sensors are supplied to a controller that controls the rotation of the motor and the propellers. The tracking device also includes a power supply for the motor and the controller.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
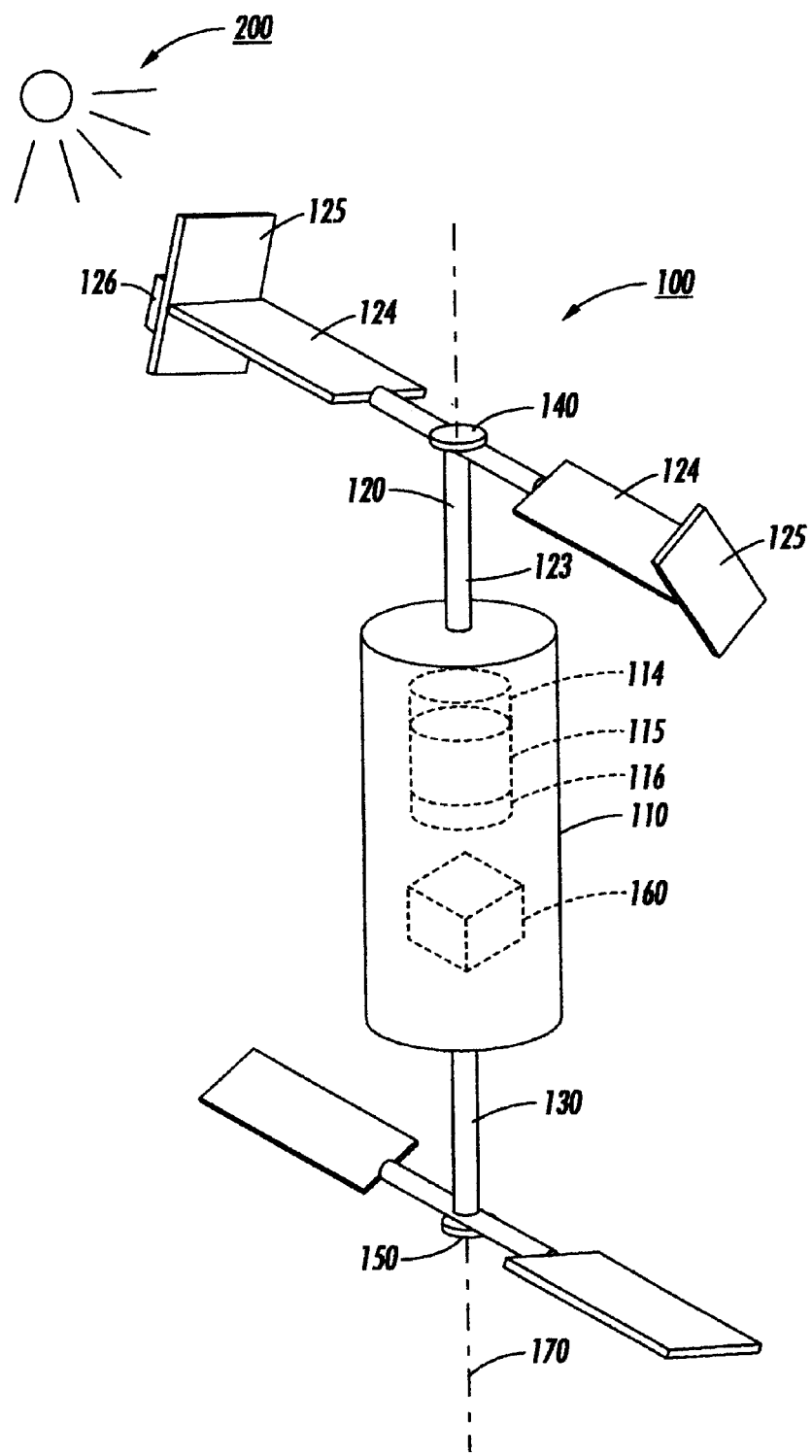
FIG. 1 is a perspective view schematically illustrating one exemplary embodiment of a tracking device according to the invention.

FIG. 1 is a perspective view of a first exemplary embodiment of a tracking device 100 according to the invention. A motor 110 has a top propeller 120 connected to a stator 114 of the motor 110 and a bottom propeller 130 connected to a rotor 116 of the motor 110. It should be appreciated, however, that the top propeller 120 may be connected to the rotor and the bottom propeller may be connected to the stator. The top propeller 120 has a sense opposite the sense of the bottom propeller 130. For example, the top propeller 120 is righthanded and the bottom propeller 130 is lefthanded, or vice versa. As the top propeller 120 and the bottom propeller 130 rotate in opposite directions, they supply a force in the same direction, e.g., a vertical direction.

Figure 2:
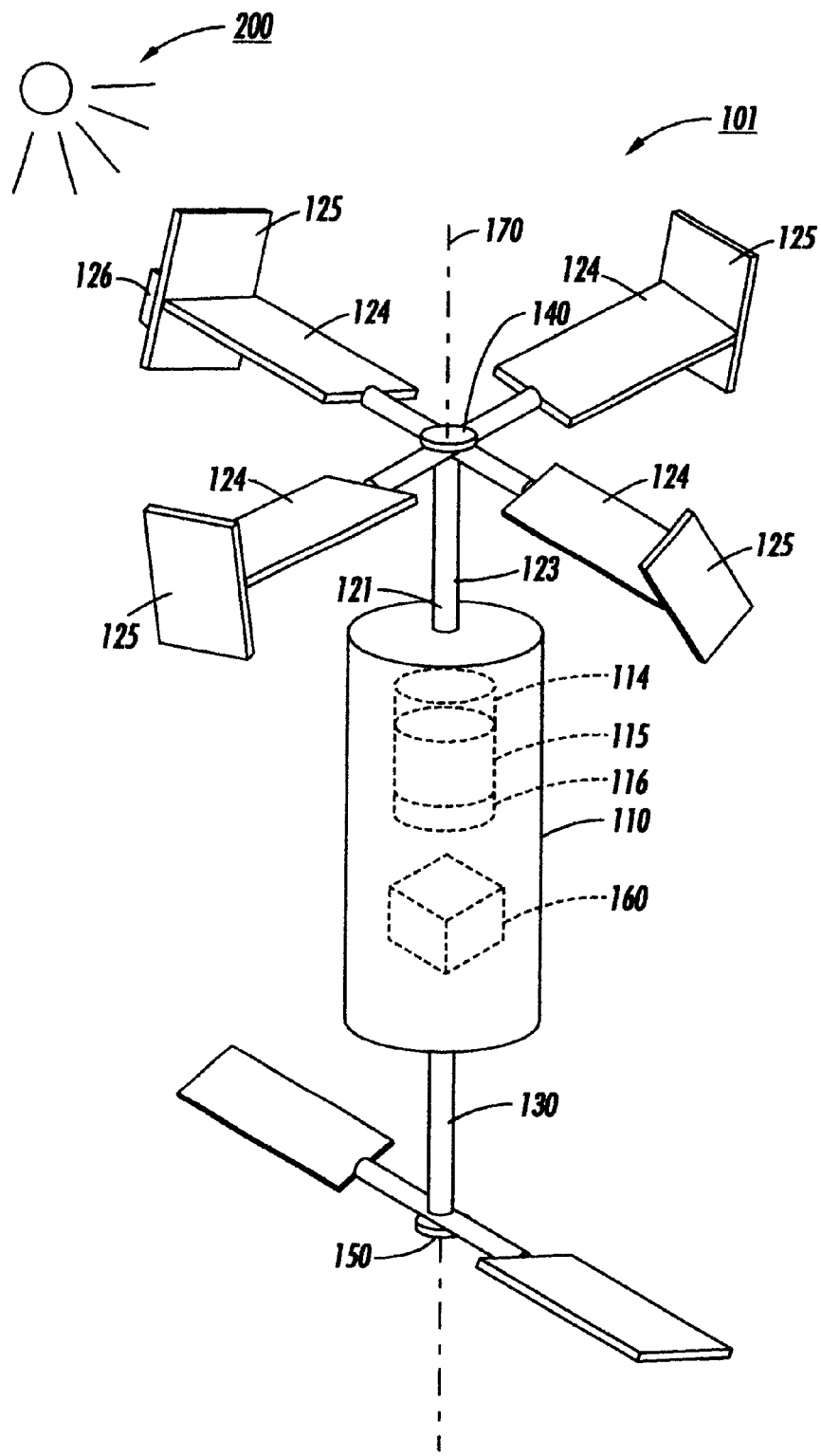
FIG. 2 is a perspective view schematically illustrating a second exemplary embodiment of the tracking device according to the invention.

Fins 125 are attached to the tips of the top propeller 120. The fins 125 are generally tangent to the direction of rotation of the top propeller 120. The fins 125 stabilize the tracking device 100 so that a spinning axis 170 of the tracking device 100 maintains a generally vertical orientation. As shown in FIG. 1, the tracking device 100 has a two-bladed top propeller 120. FIG. 2 shows a second exemplary embodiment of a tracking device 101 according to the invention, where the top propeller 121 is a four-bladed propeller. Thus, four fins 125 are provided at the tips of the blades 124. It should be appreciated that any multitude of blades may be used.

Figure 3:
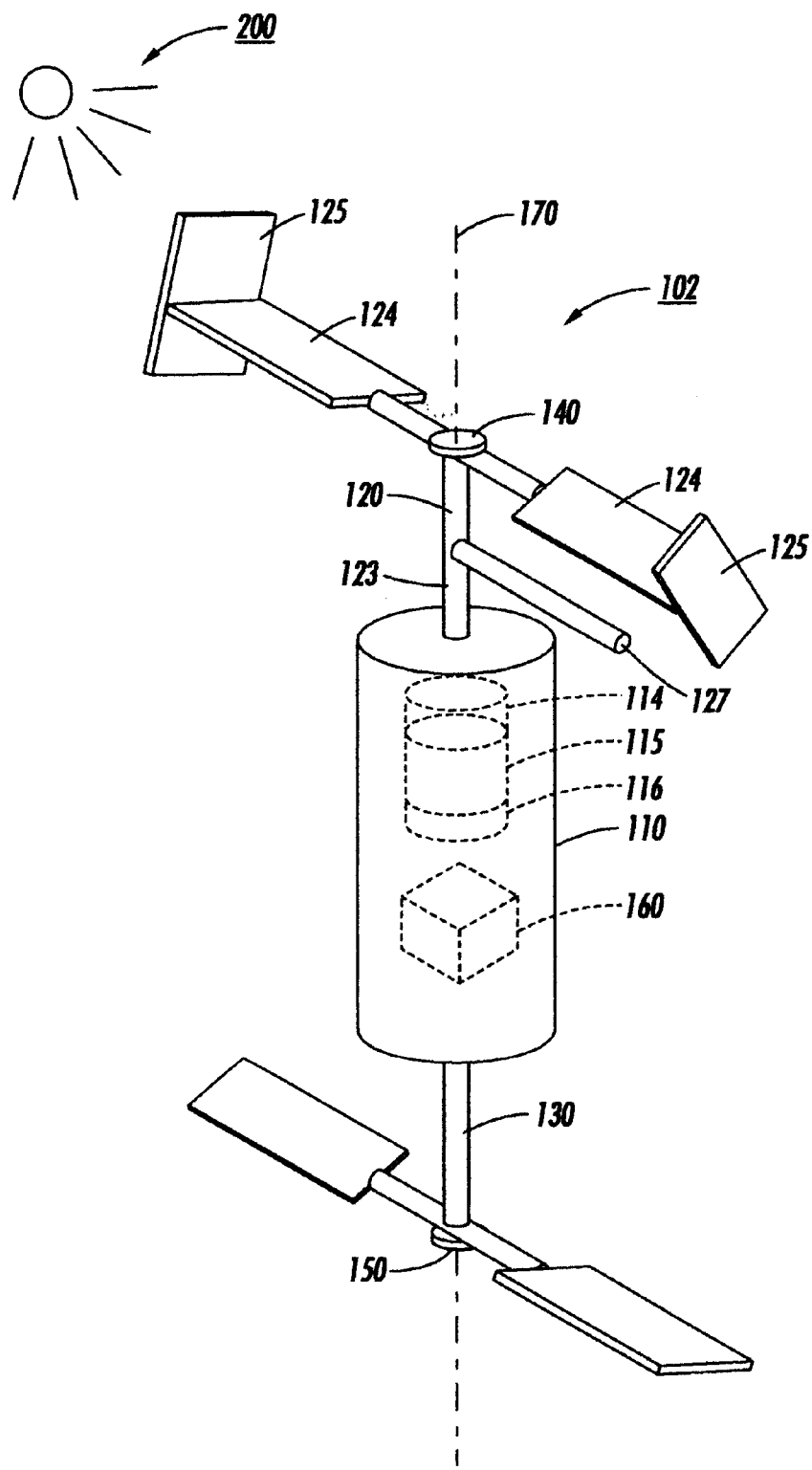
FIG. 3 is a perspective view schematically illustrating a third exemplary embodiment of the tracking device according to the invention.

As shown in FIGS. 1 and 2, a weight (unbalancing structure) 126 is attached to one of the fins 125. Thus, the weight 126 is offset from the spinning axis 170. The weight 126 causes the tracking devices 100 and 101 to move helically with the major axis of the helix being vertical. As shown in FIG. 3, in a third exemplary embodiment of a tracking device 102 according to the invention, instead of the weight 126 that is attached to one of the fins 125, a weight 127 is attached to a shaft 123 of the top propeller 120. In various exemplary embodiments, the weight 127 is freely rotatable relative to the top propeller 120.

It should be appreciated that any known or later-developed device, structure, mechanism, material or the like that can be used to unbalance the top and/or bottom propellers 120 and 130 can be used in place of the weights 125 and 127. That is, so long as the tracking device 100–102 has a center of mass that is not aligned to the spinning axis 170, the spinning axis 170 of the tracking device will be at an angle to the gravitational field. Then, as long as the center of mass rotates around, or is otherwise moveable relative to the spinning axis 170, the spinning axis 170 will precess around the center of gravity.

Thus, the tracking device 10–102 can be unbalanced by making some of the propeller blades 124 and/or the fins 125 out of materials that have a different density than the other propeller blades 124 and/or fins 125, by making some of the propeller blades 124 and/or fins 125 with different dimensions than the other propeller blades 124 and/or fins 125, by making some of the propeller blades 124 and/or fins 125 provide different amounts of lift than the other propeller blades 124 and/or fins 125, by combinations of these, and/or any other known technique for unbalancing the tracking device 100–102, either with or without being combined with the various exemplary recited techniques discussed herein.

Two target sensors 140 and 150 are provided on the top propeller 120 and on the bottom propeller 130, respectively. The target sensors 140 and 150 detect a target 200 that may be sensed by any phenomenon, such as light, sound, magnetic fields, RF or other electromagnetic radiation, heat, and nuclear radiation, or any other known or later-discovered phenomenon, that provides a magnitude. Thus, the target 200 can be a source of sound energy, light energy, one or more magnetic fields, RF radiation, other electromagnetic radiation, nuclear radiation, heat energy, vibrational energy, solar energy, or the like. Additionally, or alternatively, the target sensors 140 and 150 may be responsive to signals from the global positioning satellite (GPS) system.

The target sensors 140 and 150 provide signals to a controller 160. The signals are responsivel to the distance of the sensors 140 and 150 from the target 200. A power supply 115 provides power to the motor 110 and the controller 160. The power supply 115 may be, for example, one or more conventional batteries, or a compressed spring, or twisted rubber band, or pressurized gas, or combustible fuel. It should also be appreciated that the motor 110 and the controller 160 may each be provided with a separate power supply or supplies. The target sensors 140 and 150 may be solar cells allowing the tracking devices 100, 101, and 102 to track the sun as a planet rotates. Such solar cells may also function as the power supply to the motor 110 and the controller 160 in addition to sensing the sun.

The controller 160 controls the motor 110 to modulate a speed differential ω between the top propeller 120 and the bottom propeller 130. The modulation is responsive to the differential between the signals provided by the target sensors 140 and 150. In various exemplary embodiments, the controller 160 determines the speed differential between the top propeller 120 and the bottom propeller 130 as:

$$\omega = a \cdot \Delta S + b,$$

where:
 a is a gain factor;
 ΔS is the difference between the signal from the sensor 140 and the signal from the sensor 150; and
 b is an offset value.

The offset value b is needed to maintain the speed differential so that the tracking devices 100–102 may continue to fly. In various exemplary embodiments, the gain factor a and the offset value b are empirically chosen values that depend on specific parameters of the tracking devices 100–102, such as their weight.

As the spinning axis 170 of the tracking device 100 points more towards the target 200, the speed differential ω increases due to an increase in the signal S140 provided by the target sensor 140. As the spinning axis 170 of the tracking device 100 points away from the target 200, the speed differential ω decreases due to a decrease in the signal S140 provided by the target sensor 140. An increase in the speed differential ω causes the tracking device 100 to accelerate toward the target 200 by precession of the spinning axis 170 caused by the weight 126. A decrease in the speed differential ω causes the tracking device 100 to decelerate. If the target 200 is vertically above the tracking device 100, the controller 160 will cause the tracking device 100 to increase its speed and spiral upward until it passes the target 200 at which point the controller 160 will cause the tracking device 100 to decrease its speed. Although the various exemplary tracking devices 100–102 have been described as moving toward the target, it should be appreciated that the various exemplary tracking devices may be controlled to move away from the target.

Figure 4:
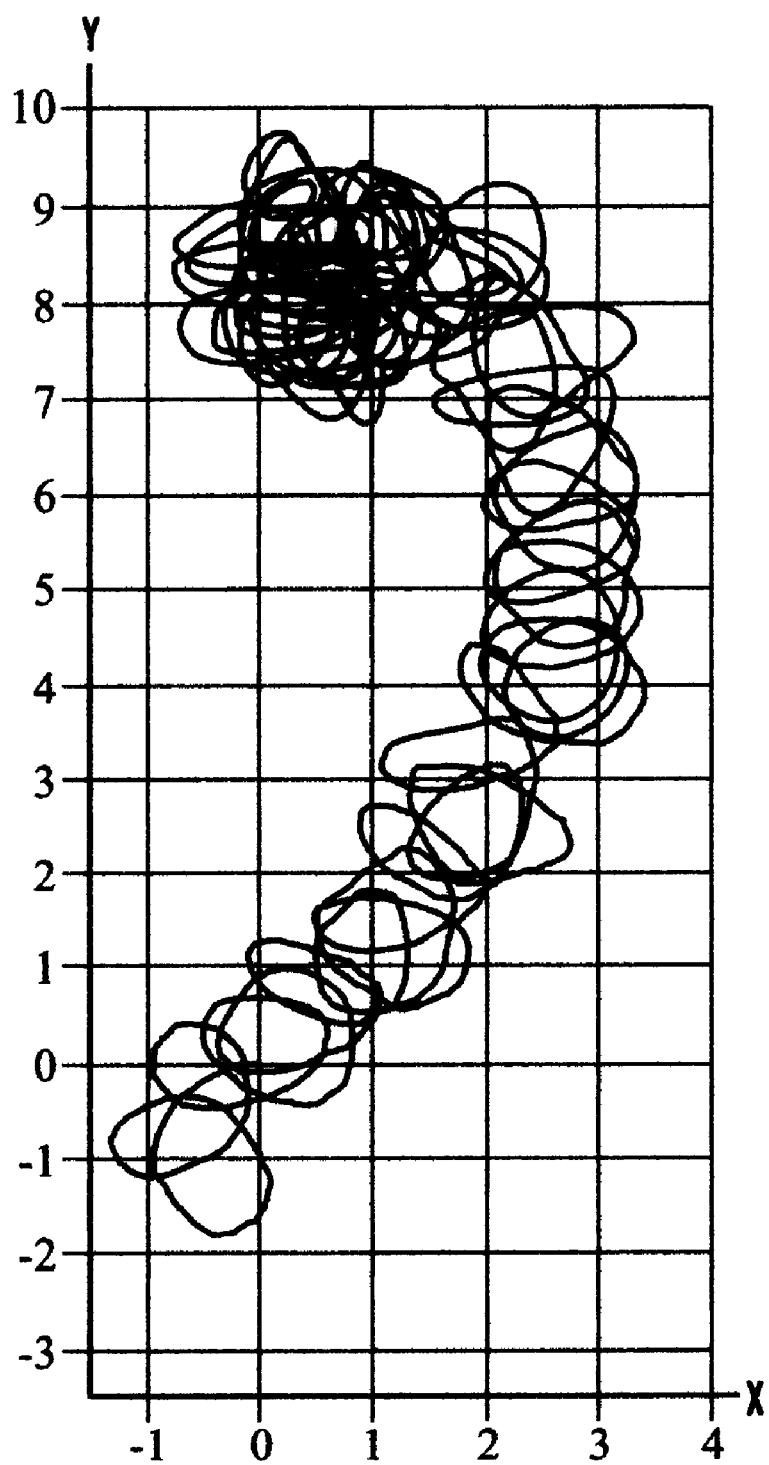
FIG. 4 is a diagram illustrating the motion of the exemplary embodiments of he tracking device according to the invention.

FIG. 4 illustrates the horizontal motion of the various exemplary tracking devices 100–102 according to the invention. A tracking device begins at coordinates (0,0) in the X-Y plane and moves toward the target 200 positioned at target horizontal coordinates (0,8) in the X-Y plane and at an unspecified target vertical position in a Z direction. As the spinning axis 170 precesses, there are points where the target sensor 140 is pointed more towards the target 200 and there are points where the target sensor 140 is pointed more away from the target 200.

Each time the target sensor 140 points more towards the target 200, the controller 160 increases the rotational speed of the top propeller 120 and the bottom propeller 130, causing the tracking device 100–102 to move toward the target 200 and to increase its vertical height. Each time the target sensor 140 points more away from the target 200, the controller 160 decreases the rotational speed of the propellers 120 and 130, causing the tracking device 100–102 to move away from the target 200 and to decrease its vertical height.

The controller 160 directly controls the vertical height of the tracking device by controlling the rotational speed of the propellers 120 and 130. The horizontal motion of the tracking device 100–102, however, is controlled by precession of the spinning axis 170.

The various exemplary tracking devices 100–102 according to the invention disclosed herein may be used: in mobile remote sensors, for planetary exploration, to track moving land-based agents, such as people, animals, munitions, troops, and/or vehicles, to track environmental conditions and/or weather patterns, in automatically deployable parameter sensors, in robot pixels for displays or smart toner, for "over-the-hill" scouting, for covert surveillance, and in laser guided smart-bombs or flash-bangs, toys, robo-pets, computer input devices (for example using voice) that follow a mobile user around. As the various exemplary tracking devices 100–102 according to the invention disclosed herein include only one motor, no transmission and a single controller, the cost and complexity of the tracking devices 100–102 are reduced relative to the conventional devices disclosed above.

Although the various exemplary devices 100–102 have been disclosed as tracking devices, it should be appreciated that the various exemplary devices 100–102 may function as toys or amusement devices, with or without the target sensors.

It should be understood that the controller 160 shown in FIGS. 1–3 can be implemented as a physically distinct hardware circuit or an ASIC, or using an FPGA, a PDL, a PLA or a PAL, or using discrete logic elements or discrete circuit elements. The particular form the controller 160 shown in FIGS. 1–3 will take is a design choice and will be obvious and predictable to those skilled in the art. For example, the controller 160 may include three signal-conditioning operational amplifiers, a field effect transistor (FET), a power transistor and resistors.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A tracking device, comprising:
   a motor including a rotor and a stator;
   a first propeller connected to the rotor;
   a second propeller connected to the stator;
   a first target sensor on the first propeller;
   a second target sensor on the second propeller;
   at least one unbalancing structure attached to one of the first and second propellers;
   a controller that controls a rotational speed of the motor based on signals provided by the first and second target sensors; and
   at least one power supply for the motor and the controller,
   wherein the tracking device moves in a helical pattern with a major axis of the helical pattern being vertical.

2. The tracking device according to claim 1, further comprising fins at tip ends of the first propeller tangent to a direction of rotation of the first propeller.

3. The tracking device according to claim 2, wherein the unbalancing structure comprises at least one weight on a fin of the first propeller.

4. The tracking device according to claim 1, wherein the unbalancing structure comprises at least one weight rotatably mounted to the first propeller.

5. The tracking device according to claim 1, wherein a target is a magnetic field, a sound source, a light source, a heat source, an RF radiation source, or a nuclear radiation source.

6. The tracking device according to claim 1, wherein the controller controls the motor to move the tracking device toward a target.

7. The tracking device according to claim 1, wherein the controller controls the motor to move the tracking device away from a target.

8. The tracking device according to claim 1, wherein the at least one power supply is a battery.

9. The tracking device according to claim 1, wherein the at least one power supply is a solar cell.

10. The tracking device according to claim 1, wherein as a spinning axis of the tracking device points more towards a target, the speed differential increases due to an increase in the signal provided by first target sensor, and as the spinning axis points away from the target, the speed differential decreases.

11. The tracking device according to claim 1, wherein the first propeller and the second propeller are located at opposing ends of the tracking device and wherein the first propeller rotates in a direction opposite a rotation direction of the second propeller.

12. The tracking device according to claim 1, wherein the first propeller comprises propeller blades extending from a shaft at the first propeller and a fin attached to a tip of each of the propeller blades, which fins are tangent to a direction of rotation of the first propeller.

* * * * *